United States Patent [19]

Hopfield et al.

[11] Patent Number: 4,937,872
[45] Date of Patent: Jun. 26, 1990

[54] NEURAL COMPUTATION BY TIME CONCENTRATION

[75] Inventors: John J. Hopfield, Pasadena, Calif.; David W. Tank, Maplewood, N.J.

[73] Assignee: American Telephone and Telegraph Company, New York, N.Y.

[21] Appl. No.: 384,084

[22] Filed: Jul. 24, 1989

Related U.S. Application Data

[63] Continuation of Ser. No. 33,942, Apr. 3, 1987, abandoned.

[51] Int. Cl.$^5$ .......................... G10L 5/06; G06K 9/00
[52] U.S. Cl. ..................................... 381/43; 382/10
[58] Field of Search ...................... 381/41–46; 364/513, 513.5, 200 MS file, 900 MS file, 807; 382/10–11, 13–15, 17–19, 30

[56] References Cited

U.S. PATENT DOCUMENTS

| | | | |
|---|---|---|---|
| 3,097,349 | 7/1963 | Putzrath et al. | 381/41 |
| 3,273,125 | 9/1966 | Jakowatz | 364/900 |
| 3,287,649 | 11/1966 | Rosenblatt | 381/43 |
| 3,610,831 | 10/1971 | Moshier | 381/43 |
| 4,752,906 | 6/1988 | Kleinfeld | 364/807 |
| 4,755,963 | 7/1988 | Denker et al. | 364/807 |

Primary Examiner—Gary V. Harkcom
Assistant Examiner—John A. Merecki
Attorney, Agent, or Firm—Henry T. Brendzel

[57] ABSTRACT

Apparatus that solves the problem of pattern recognition in a temporal signal that is subject to distortions and time warp. The arrangement embodying the invention comprises a neural network, an input interconnection network, and a plurality of signal modification circuits. A plurality of input leads delivers a preselected characteristic stimulus to associated signal modification units, and in response to an applied stimulus, each signal modification unit develops a plurality of output signals that begins at the time of stimulus application, rises to a peak, and decays thereafter. The mean time delay of each output (time to reach the peak) is different for each of the modification unit output signals. The outputs of the signal modification units are applied to the input interconnection unit wherein connections are made in accordance with the sequences that are to be recognized.

8 Claims, 7 Drawing Sheets

NEURAL COMPUTATION BY TIME CONCENTRATION

This application is a continuation of application Ser. No. 033,942, filed on April 3, 1987, now abandoned.

BACKGROUND OF THE INVENTION

This invention relates to pattern recognition systems, and more specifically, to systems employing neural computation to detect preselected sequences in time-varying input signals.

Neural networks have been described by J. J. Hopfield in "Neurons With Graded Response Have Collective Computational Properties Like Those of Two-state Neurons"; *Proc. Natl. Sci.*, USA Vol. 81, pp. 3088-3092; and by J. J. Hopfield and D. W. Tank in "'Neural' Computation of Decisions in Optimization Problems", *Biological Cybernetics*, Vol. 52, 1985 pp. 141-152; as well as in U.S. patent application Ser. No. 693,479 filed on behalf of J. J. Hopfield of January 2, 1985, and U.S. patent application Ser. No. 795,789 filed on behalf of J. J. Hopfield and D. W. Tank on November 7, 1985.

Basically, a neural network is a highly parallel computational circuit comprising a plurality of amplifers, with each of the amplifiers feeding back its output signal to itself and all of the other amplifiers or chosen other amplifiers through conductance $T_{ij}$. The $T_{ij}$ conductances (where $T_{ij}$ denotes the conductance between the output of amplifier j and the input of amplifier i) and the associated connections can be thought of as comprising a connection network which has one output signal set and two input signal sets. The output signal set is applied to the amplifier inputs, one of the input signal sets is derived from the amplifier outputs, and the other input signal set is responsive to input stimuli applied to the neural network. As shown in the prior art, one can explicitly specify the values of the $T_{ij}$ conductances to achieve predetermined results, such as reaching different specified output states of the amplifier in response to different ranges of input stimuli. Also as described in the prior art, an input interconnection network may be interposed between the input stimuli and the second set of inputs of the feedback network. The input interconnection network, which comprises a feed-forward arrangement, converts the expected input signals to corresponding signals that drive the feedback network and the amplifiers. There is no time dependence, however, in this interconnection network.

The arrangement described can be employed to perform many tasks, and we described, by way of example in our 795,789 patent application, its use as an A/D converter. However, not all tasks can be performed with this arrangement alone, and recognition of patterns in time-dependent signals is one such task.

Recognizing patterns in time-dependent signals is an important task that we perform effortlessly in our everyday life. For example, the tasks of recognizing individual spoken phonemes, isolated spoken words in a continuous stream of speech are rapidly accomplished by a person who understands the language being spoken. Similarly, in a movie, if a person is replaced by a pattern of a few dots representing parts of the body, and the person is moving, people who see only the moving dots can immediately identify the dynamic pattern as "a person moving", in spite of complete inability to recognize a "person" from a stationary pattern of the dots (e.g., a single frame of such a movie).

The use of networks to recognize patterns in some classes of continuous input signals has been employed in various contexts. Most of these applications, however, deal with predetermined sequences of input signals and require that the sequence searched for appear exactly as expected, lest it be determined that the sequence is not there at all. There is no room in most systems for concept of "mostly present". The reason for this sensitivity (or rigidity) is that responding to an input sequence that is only close to the expected one is a much more difficult problem to solve. Still, some work has been done in this area. For example, in *Neural Theroy and Modeling*, ed. R. F. Reis (Stanford University Press, Stanford, Ca.), pp. 105-137, use is described of bandpass filters constructed from simple networks of three or four formal neurons having different time delays. The arrangement described permits recognizing some elementary signal patterns. More recently, a temporal associative memory has been described by K. Fukushima (1973) *Kybernetic* Vol. 12, pp. 58-63. The network functions by mapping the previous states along a spatial gradient using a set of discrete time delays (shift register). At each clock cycle, the pattern of activity projects the network into the next state in the sequence, using connections that code for all known sequential projections in the same way that associative networks code for all known memories.

These prior art techniques fail for the general pattern recognition case, where the input signal is continuous so that the beginning of the searched-for sequence is not known, and its duration is variable. Also in the general case, the searched-for sequence is often distorted in the data stream because of missing or extraneous signal portions, and because of time warp. A signal containing a sequence is time warped when the relative durations of the components making up the searched-for sequence are different from the expected relative durations.

By way of example, the general pattern recognition problem is illustrated by two sequences, in which each letter symbol represents a particular momentary stimulus state, and the time duration of the stimulus states is represented by letter repetitions. The first sequence (the sound of the word "series") represents the searched-for stimulus sequence, and the second sequence is the data in which a distorted version of the first sequence is embedded in a continuous steam ("this series sounds").

SSEEEERIIEZZZ
THHSSEARREEZSSOOUNNDZ

The pattern recognition task is to recognize the first sequence in the second data stream.

Although real situations will generally have continuous time and continuous patterns to deal with, the difficulty of the task can be quite easily understood and appreciated from the above discrete example. Difficulties include (1) where to start the comparison (word-break problem), and (2) given a starting point, different examples of the sequence may be distorted both in time (time warp problem) and in form (missing or extraneous signals).

It is the object of this invention to provide means for more effectively recognizing preselected sequences in a time-dependent signal. It is another object of this invention to provide a simple technique for constructing robust networks for detecting sequences in a time-dependent signal that contains form and time warp distortions.

SUMMARY OF THE INVENTION

These and other objects of the invention are realized with an arrangement comprising a neural network, an input interconnection network, and a plurality of signal modification circuits. The arrangement responds to a plurality of input leads which deliver a preselected characteristic stimulus to each associated signal modification unit. In response to an applied stimulus, each signal modification unit develops a plurality of output signals that begin at the time of stimulus application, rise to a peak, and decay thereafter. The mean time delay of each output (time to reach the peak) is different for each of the modification unit output signals. The outputs of the signal modification units are applied to the input interconnection network wherein connections are made in accordance with the sequences, or patterns, that are to be recognized, and the output of the interconnection network is applied to the neural network.

DETAILED DESCRIPTION

Because data which contains the sequences to be detected exhibits distortion as described above, and because neural networks can be robust with respect to input signal deficiencies (as in the realization of a content addressable memory), we investigated the possible use of neural networks in solving the heretofore difficult pattern-recognition problem described above.

In the aforementioned prior art references the concept of an energy function, E, was introduced in connection with neural networks. The energy function was useful in understanding how the circuit works by observing that the circuit moves in the direction of minimizing the energy function. It was also shown how fashioning a given task to be solved to a specific energy function provides a complete description of the required connections and inputs.

The concept and use of the energy function can be extended to time varying input stimuli.

The essence of the energy function formulation for time-varying signals is that the circuit's behavior is related to the energy function in such a way that the motion of the circuit, while decreasing E, moves in the direction of detecting the correct input sequence as the information is being fed to the circuit. The central geometrical idea in computing with time-varying inputs can be easily visualized using the "space-time" E surface illustrated in FIG. 1.

Figure 1:
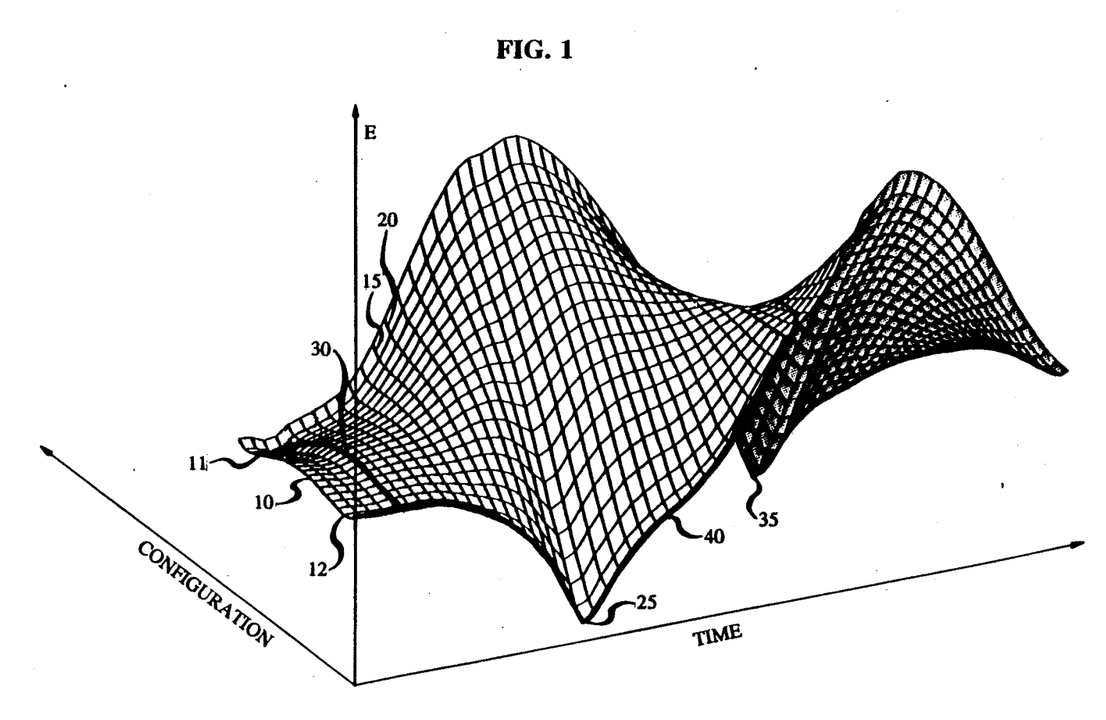
FIG. 1 depicts the energy-time surface of a two-neuron arrangement adapted to respond to a continuous signal and to detect two different input patterns.

FIG. 1 depicts an energy surface of a two-neuron system (two amplifiers in the neural network) with the state of the system being described by the "configuration" axis. There is also a "time" axis and the "E" energy axis in the FIG. 1 depiction.

The initial energy function of the FIG. 1 system, at time $t=0$ and with no input stimuli, is described by curve 10 and it is characterized by two valleys, at points 11 and 12. Valleys 11 and 12 reflect the fact that when an input is applied, the two interconnected amplifiers in the neural network act as a flip-flop which can rest in one of two states (i.e., valley 11 or valley 12). When an input is applied to the flip-flop in order to set the flip-flop to one of the two states, the energy function changes to emphasize one valley and to de-emphasize the other valley, and the state of the system moves from wherever it was to the emphasized valley. Thus, the flip-flop is set to the desired state. The setting input is, in fact, a time varying stimulus that changes the energy function as shown, for example, by the successive curves 15 and 20. The changing energy function creates a path of continually decreasing value of energy function E that leads, in FIG. 1, to the deep valley of point 25. That path (assuming the initial state is at point 11) is depicted in FIG. 1 by curve 30.

Subsequent input signals again change the energy function and move the state of the system from point 25 to the other deep valley of the energy function, at point 35. The path traversed from point 25 to point 35 is depicted in FIG. 1 (at least its visible portion) by curve 40.

In the two neuron system of FIG. 1 the applied input stimuli acting through the time-dependent connections can be viewed as controls for setting or resetting the flip-flop. Alternatively, the flip-flop and time-detendent interconnection network can be viewed as a circuit for detecting the appearance of particular stimuli in the input signals. It is with the latter view that a multi-neuron circuit can be used to detect sequences of stimuli in time-varying input signals.

To achieve the desired changes in the energy function so that input sequences may be detected one must do two things: (1) employ the the information as it becomes available to shape the energy function in the direction of the likely (recognizable) sequences, and (2) combine all of the information that is available, in some coherent fashion, so that the sum total of the information directs the system to the deep valley in the energy function which corresponds to detection of the sequence found in the input stream. This is not unlike recognition of speech patterns by humans, where we begin to recognize a word as soon as the first sounds are heard, and continue the process of recognition with an increasing degree of confidence, until we recognize the full word—sometimes even before the last sound is heard.

To permit use of past information at some ultimate time of sequence detection, as well as from the time of availability until the time of sequence detection, it is clear that some memory must be provided. Thus, in accordance with the principles of our invention one must provide "stretch delay" means that judiciously make input signals avilable for prolonged time intervals and chosen so that the output state corresponding to a correct interpretation of the input sequence is present shortly after completion of that sequence.

Structure that embodies the above principles of our invention and which realizes this time dependent variation in the energy function that leads to the desired sequence detection, can be quite simple. One such structure is depicted in FIG. 2.

Figure 2:
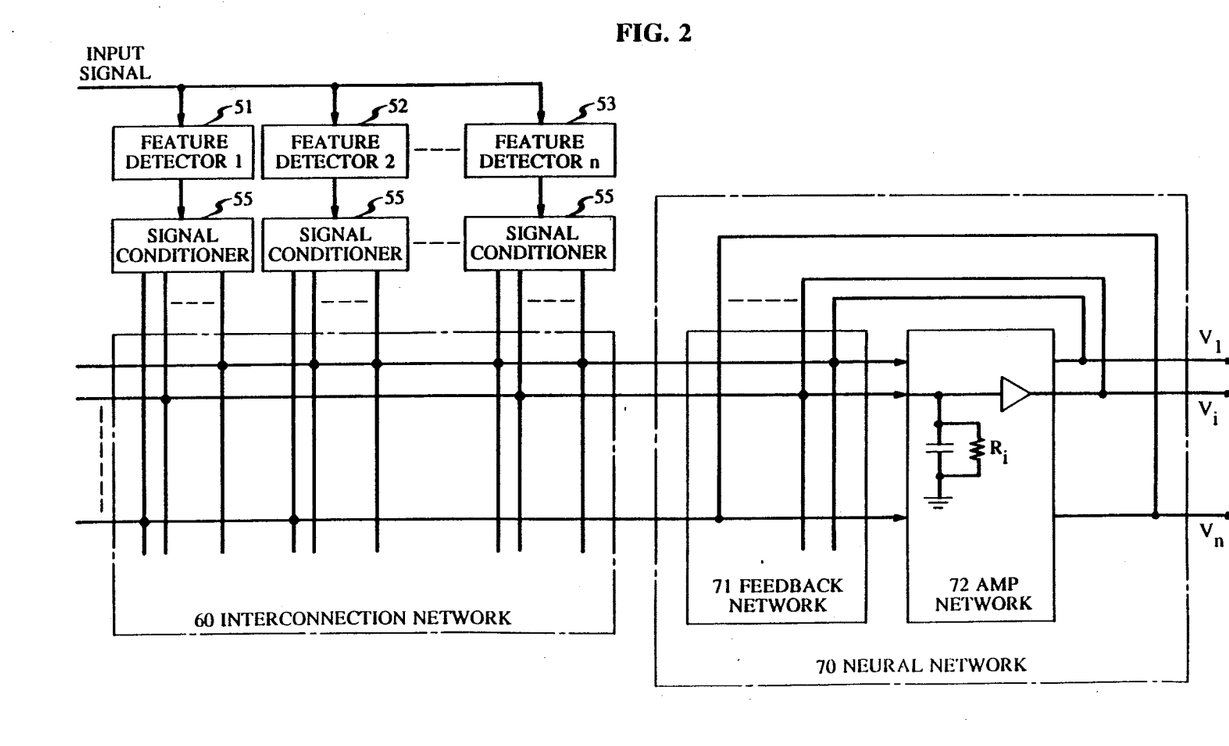
FIG. 2 illustrates one structural embodiment incorporating the principles of our invention.

FIG. 2 includes feature detectors 51–53 which are responsive to signals applied on line 50 and which are turned to detect particular features in the input signal. The output signals of feature detectors 51–53 are each applied to a signal conditioner circuit 55 (the stretched delay means) which develops the aforementioned signals that are used to create the path for the circuit dynamics and concentrate the information in the input signals to the time of sequence detection. The output singals of signal conditioners 55 are applied to interconnection network 60, and the output signals of interconnection network 60 are applied to neural network 70. As mentioned earlier, the neural network comprises an amplifier network (72) and a feedback network (71). The feedback network accepts the output signals of the interconnection network, and the output signals of amplifier network 72 comprise the output signals of the FIG. 2 circuit.

Feature detectors 51–53 in FIG. 2 form a part of the input signal preparation apparatus, and are highly related to the specific application in connection with which our invention is employed. Indeed, in some applications a single multi-output detector can serve as the means for identifying features of the input signal. For example, if the data stream comprises text that is encoded in some manner, the task is to detect valid codes. That task can be accomplished with a single, multi-output, feature detector. If, on the other hand, the data stream represents spoken speech, then the task of feature detectors 51–53 may be to identify formants, or phonemes. That task may, perhaps, be best accomplished with a plurality of feature detectors. Most languages, including English, can be described in terms of a fairly small set of distinctive sounds, or phonemes. American English, for example, can be described with about 42 phonemes; (*Digital Processing of Speech Signals*, L. R. Rabiner and D. W. Schafer, Prentice-Hall, Inc., Englewood Cliffs, New Jersey, 1978, p. 42) and that may suggest that sophisticated speech detection systems should employ a set of feature (phoneme) detectors. Phoneme detectors, as an aside, are described in a number of publications, such as U.S. Pat. No. 4,592,085; U.S. Pat. No. 4,559,604; and U.S. Pat. No. 4,405,838.

To better understand our invention and appreciate its inherent capabilities and advantages, the following first presents a brief mathematical background and foundation for the process by which our invention may be realized. The developed equations also provide insight into the operation of the FIG. 2 embodiment.

First, it is useful to keep in mind that the equation of motion for neural network 70, as taught by the prior art, minimizes the energy function expressed by $$E = -\tfrac{1}{2}\sum_i \sum_j T_{ij}V_iV_j + \sum_i (1/R_i)\int_0^{V_i} g_i^{-1}(V)dV - \sum_i V_iI_i. \quad (1)$$

where $V_i$ and $V_j$ are the output voltages of amplifiers i and j, respectively, in amplifier network 72; $T_{ij}$ is the conductance within the feedback network that connects the output of amplifier j to the input of amplifier i; $R_i$ is the input impedance of amplifier i; $g_i^{-1}(V)$ is the inverse of amplifier i; and $I_i$ is the current input to feedback network 71 (from network 60) leading to the input of amplifier i. The energy function of network 70 is changed, as discussed above, through the last term in equation (1).

Second, for purposes of simplification, the following analysis is in terms of discrete sequence components ($X_i$), which implies discreteness in both the signal and the time domains. There is no loss of generality in doing that, because the signal domain is often expected to be discrete (e.g., a certain speech phoneme is either detected or not detected), and the time domain can be approximated to any desired degree of accuracy by simply considering small enough time intervals, and permitting attrubutes that have long durations to be represented by repetitions of sequence components. Discreteness in the signals domain is reflected in the FIG. 2 circuit by the finite plurality of feature detector outputs, which discreteness in the time domain is embodied in the finite plurality of outputs from signal conditioners 55.

In light of the above simplifications, a searched-for sequence $S^j$ can be described by an exemplar stimuli sequence such as $$X_2X_1X_1X_3X_4X_4X_4X_5,$$

where each $X_m$ represent distinct stimulus states. Note that the subscript identifies a specific stimulus type or feature and not its ordinal position in the sequence.

In accordance with one paricular embodiment of our invention we may wish to activate output j of our apparatus ($V_j=1$ in network 70) when a signal rather like $S^j$ is detected. This is achieved by providing for a contribution by each $X_m$ appearing at $t = t_{det} - \tau$ (where $t_{det}$ is the time of sequence detection) towards the creation of a path on the energy-time surface that leads to the detection of the sequence $S^j$ that is evidenced by the presentation of the stimulus $X_m$ at $t = t_{det} - \tau$. This contribution is achieved by including terms in the energy function of the form $$-V_j \sum_{X_m} \int_0^{\infty} T_{jX_m;k}f_k(\tau)D_{X_m}(t-\tau)d\tau, \quad (2)$$

and the inclusion is through the last term in equation (1). In the $I_i$ portion of equation (2), $D_{X_m}(t-\tau)$ represents the output of a feature detector tuned to stimulus $X_m$ (one of the feature detectors of FIG. 2). That is, $D_{X_m}(t-\tau) = 1$ if $X_m$ is present at time $t-\tau$, and 0 otherwise. The $f_k(\tau)$ term relates to the $k^{th}$ output signal of signal conditioner 55, and the coefficient $T_{iX_m;k}$ represents the strength of the connection between the $f_k(\tau)$ signal that is associated with the signal conditioner connected to the feature detector of stimulus $X_m$, and the $i^{th}$ output of interconnection network 60 (which develops the $I_i$ signal).

The $f_k(\tau)$ function defines the stretchable delay of conditioners 55. It is akin to the impulse response of a circuit that, when pulsed (when $X_m$ is detected and $D_{X_m}$ momentarily goes to 1), an output signal is developed that has a particular shape as a function of time. The $f_k(\tau)$ terms thus provide a spreading in time of the momentary pulse, as well as amplitude control of the output. In accordance with the principles of our invention, the $f_k(\tau)$ impulse response begins at $\tau=0$, rises to a peak, decays thereafter, and finally terminates. It is useful for the peak to occur at a value of $\tau$ that is proportional to k. With such a family of $f_k(\tau)$ impulse responses, equation (2) contribution produces an elongated pit on the space-time E surface defined by equation (1). That pit is spatially centered in the subspace $V_j=1$, and elongated in time due to the temporal spread in $f_k(\tau)$. For a later stimulus in the sequence $S^j$, one would provide corresponding time-dependent terms in E, but with the $f_k(\tau)$ chosen to peak with shorter latency, so that the information presented by the activation of each stimulus detector contributes to the same pit in space-time. Advantageously, the breadth of the individual delays produced by the different $f_k(\tau)$ should increase with the mean delay time, so that early stimuli in the sequence produce longer contributions on the E surface. The net result is a valley in E that is somewhat collective and insensitive to exact timing. A valley of considerable depth occurs at sequence completion even if the presented sequence is a distortion of the exemplar. The pit depth is a measure of the evidence that sequence $S^j$ was presented to the network.

Evidence from detected stimuli against a given exemplar is similarly treated by inhibitory connection ($T_{i,X;k}<0$) that build mounds on the E surface. In this way, erroneous symbols in the data stream of an exemplar distorted in form only add noise to the energy landscape, gracefully degrading the network performance. In order that evidence for sequence $S^j$ of different length $l^j$ be correctly combined, all connections are scaled by a factor proportional to $1/l^j$.

The contributions of equation (2) to the energy function E of equation (1) are realized in the synaptic connections within interconnection network 60. In accordance with the above-described embodiment, each neuron i is "tuned" to a different sequence $S^i$ by the organization and delay characteristics of the connections. This arrangement, by the way, is somewhat elementary in the sense that although it is convenient to simply look at neuron j to determine whether sequence j has been detected, there is no reason to make the arrangement this restrictive. Any output vector can be assigned to declare that a particular sequence has been detected, as long as the synaptic connection is appropriately arranged. With the simple "grandmother" cell arrangement described above, an amplifier network 72 with N amplifiers can accommodate only N sequences, whereas with a less restrictive arrangement a larger number of sequences can be detected. Still, the "grandmother" cell arrangement is quite satisfactory for many applications.

In addition to the contribution to E of the form expressed by equation (2), in the "grandmother" cell arrangement described above one would wish to add the penalty term $$\sum_i \sum_{i \neq i} \alpha V_i V_j$$

which insures that only one sequence at a time is detected with certainty ($V_i=1$). This term introduces an inhibition between all pairs $V_i$ and $V_j$. To prevent nonexemplar sequences from activating the network, an additional global inhibition $$\gamma \sum_i V_i$$

will set a threshold for activation.

Combining the above, the total E function for the sequence detector network is $$E = -\sum_i \sum_{X_m} \sum_k V_i \int_0^\infty T_{iX_m;k} f_k(\tau) D_{X_m}(t-\tau) d\tau + \sum_i \sum_{j \neq i} \alpha V_i V_j + \sum_i \gamma V_i + \sum_i \frac{1}{R_i} \int_0^{V_i} g_i^{-1}(V) dV. \quad (3)$$

In considering the choice for the family of functions, $f_k(\tau)$, it is realized that one can employ either digital or analog techniques and realizations. An analog realization, for example, may be attained by employing a chain of simple RC low pass networks separated by buffer amplifiers. With such an implementation, the entire circuit embodying the principles of our invention may be created in analog and asynchronous form.

Figure 3:
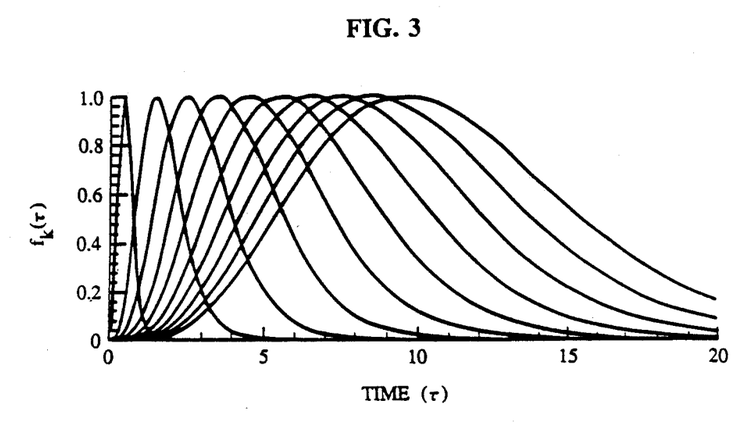
FIG. 3 illustrates one family of stretchable delay functions that may be employed in connection with our invention.

Digital circuitry can also be employed. Keeping in mind that detection of sequence stimuli can be quantized in time e.g., with a clock of period $\Delta$, suggests the creation of a family of functions where the $k^{th}$ member starts at $\tau=0$, peaks at the $k^{th}$ multiple of $\Delta$, decays thereafter, and terminates at $K\Delta$. One such family of functions can be realized with a truncated version of $$f_k(\tau) = e^\beta \left(\frac{\tau}{k\Delta}\right)^\beta e^{-\beta(\frac{\tau}{k\Delta})} \quad (4)$$

where $\beta$ is a constant that dictates the width of the impulse function. The peaks occur at $\tau=k\Delta$ as illustrated in FIG. 3.

Figure 4:
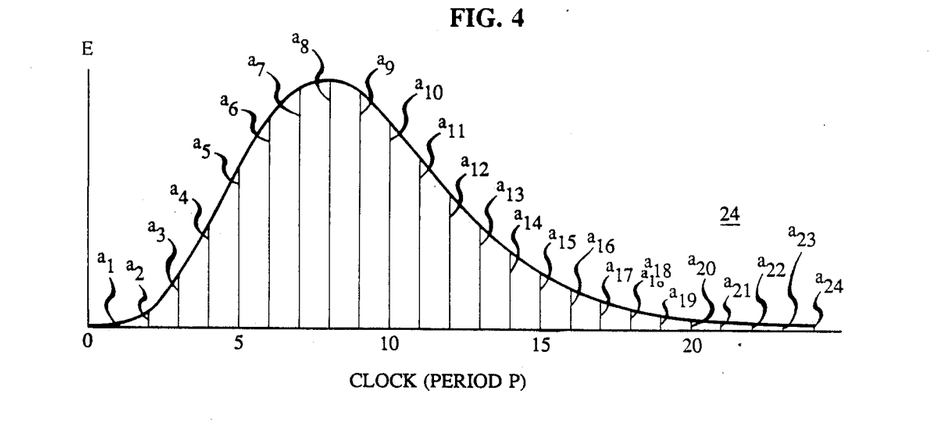
FIG. 4 depicts one stretchable delay function and the varous amplitudes that it assumes as a function of time.
Figure 5:
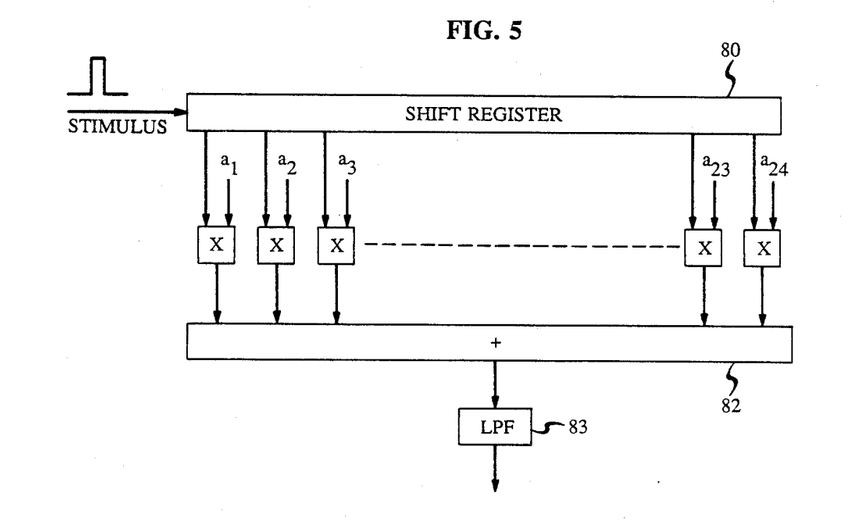
FIG. 5 depicts one realization of an FIR filter adapted for realizing the function shown in FIG. 4.

Realizing the above, $f_k(\tau)$ function (or any other stretchable delay function called for in the practice of our invention) is not difficult because the impulse response of $f_k(\tau)$ is finite. The signal processing art is replete with FIR (Finite Impulse Response) filter designs, as found, for example, in the aforementioned Rabiner et al book in chapters 2 and 6. FIG. 4 depicts one of the FIG. 3 curves, and FIG. 5 illustrates one FIR filter embodiment for realizing the FIG. 4 response. If it is assumed that FIG. 4 represents the curve for $k=1$ and that the peak is reached after 8 samples (as depicted), then the operational clock of the FIG. 5 embodiment has a period that is substantially shorter than $\Delta$; to wit, $P=8/\Delta$, and $K=3$. Accordingly, FIG. 5 includes a shift register 80 having 20 taps, the output signal of each tap is multiplied by an appropriate coefficient in multipliers 81, and the multiplication results are applied to adder 82. The sum output is then applied to a low pass filter 83 (e.g., a sample and hold circuit), to develop the desired $f_k(\tau)$ function.

Figure 6:
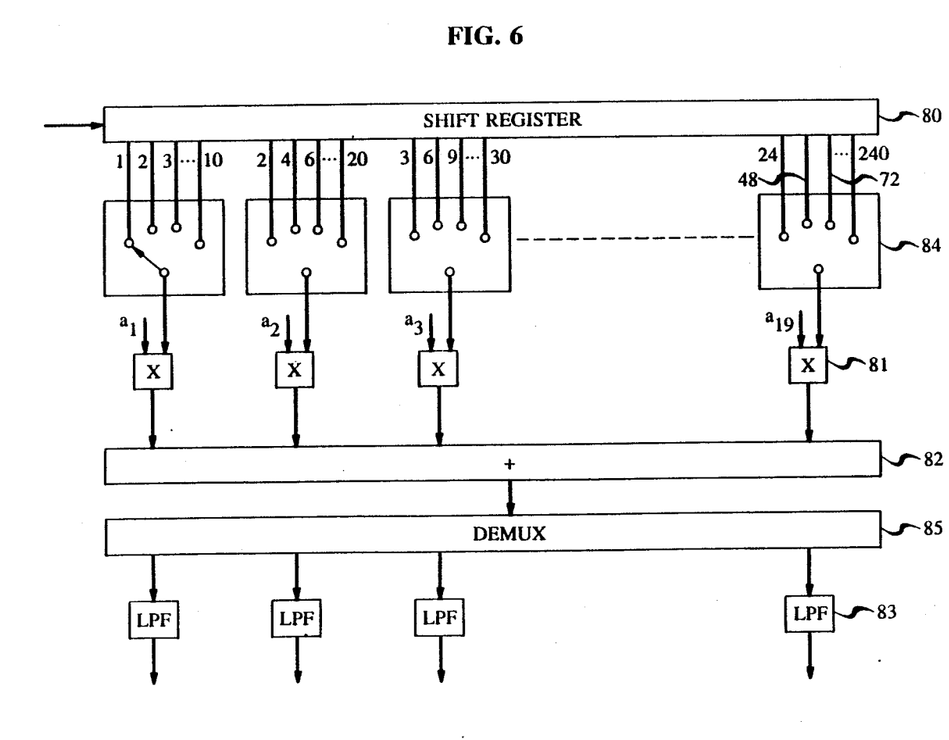
FIG. 6 expands the FIG. 5 realization to permit creation of the entire family of stretchable delay functions depicted in FIG. 3.

The FIG. 5 circuit depicts the embodiment of $f_k(\tau)$ for a particular value of k (e.g., $k=1$). However, the difference in the $f_k(\tau)$ function between different k values can be a mere stretching in time, as it is in the family of curves expressed by Equation (4). Such a family of curves can be easily realized, then, by a circuit not unlike the one depicted in FIG. 6 where multiplexers 84 and 85 permit time sharing of the bank of multipliers 81. For sake of simplicity, multiplexers 84 in FIG. 6 are drawn as if connected to sequential outputs of shift register 80. In fact, they are connected in accordance with the "stretching" that is desired, and specified by the tap identification numbers at the inputs to the multiplexers. Each of the multiplexers has a number of inputs equal to the number of different $f_k(\tau)$ functions, M, (for example, 10 in FIG. 6 corresponding to the 10 functions drawn in FIG. 3), the length of shift register 80 is KM (240 in FIG. 6), and the clock driving register 80 is adjusted to provide the appropriate maximum time delay. Following each shift of data in register 80, multiplexers 84 and 85 scan through their inputs synchronously and in rapid succession, and at each state of the multiplexers a set of products is generated and applied to combining circuit 82. The developed sums are distributed to appropriate low pass filters 83 in synchronism with the multiplexers.

Figure 7:
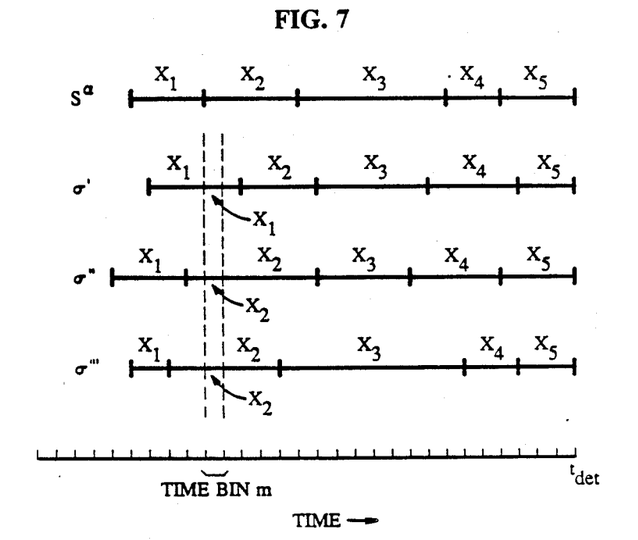
FIG. 7 shows an exemplar sequence and three possible time-warped input signals that correspond to the sequence.

The above-described $f_k(\tau)$ functions were chosen for this disclosure because they are reasonable functions which have the desired characteristics. They may be good choices when no infomation is available concerning the statistical behavior of the input signal. A better choice is possible, however, when information about the nature of the likely time distortions is available. To illustrate, a typical known exemplar sequence $S^j$ might look as sketched in FIG. 7. Typical time-warp distortions $\sigma', \sigma'', \sigma'''$ differ from $S^j$ in that individual stimuli $X_i$ in the sequence differ in duration. When $P(\sigma^{signal}|S^j)$ is the conditional probability that $\sigma^{signal}$ is generated when a sequence $S^j$ was intended, and $P(S^j)$ is the probability of occurrence of $S^j$, then when $\sigma^{signal}$ is received, the maximum likelihood choice of j, indicating sequence $S^j$ was sent, is that for which $P(\sigma^{signal}|S^j)*P(S^j)$ is largest. Equivalently, one can use the maximum of $\ln[P(\sigma^{signal}|S^j)] + \ln[P(S^j)]$. As an aside, the $\ln[P(S^j)]$ term is an amplitude factor which does not alter the pattern of connections. With that in mind, let a sequence $\sigma^{signal}$, consisting of the stimuli sequence ($X_i$ at time bin 1, $X_j$ at time bin 2, ..., $X_k$ at time bin m), be received in the data stream. If we consider only mean correlations per time bin, then the conditional probability distribution for the sequence can be factored as the product of m conditional probability distributions of finding the various symbols in the time bins, as $$P(\sigma^{signal}|S^j) = P(X_i \text{ at time bin } 1, \ldots, X_k \text{ at time bin } m|S^j) \quad (5)$$
$$= P_1(X_i|S^j)*P_2(X_j|S^j)* \ldots *P_m(X_k|S^j).$$

If the input to each of the j sequence recognition units in the network due to the detection of stimulus $X_i$ at an earlier time bin m is proportional to $\ln[P_m(X_i|S^j)]$, the relative inputs to the recognition units will be proportional to the probability that the sequence of stimuli just received is a distortion of its exemplar sequence. Note that if it is very unlikely to find a distortion of $S^j$ such that $X_i$ occurs in position m, then $P_m(X_i|S^j)$ will be very small and its logarithm (negative) will yield a strong inhibitory connection. If it is common to find such a distortion, then the probability is large, and its effect is much less inhibitory (i.e., relatively excitatory).

The meaning of the width of the delay functions is easily seen in this representation. If, for example, $S^j$ had stimuli $X_i$ in time bin m, and different stimuli in nearby bins both before and after m, then time warped examples will have $X_i$ in positions near m, with a probability distribution as a function to the nearness to m which is related to the probability distribution of this stimuli's position in time with respect to the termination of the word at $t_{det}$. For this simple model of distortion, it is clear that the inputs to the recognition units should be summed over the sequence element detectors, that time-delayed excitatory and inhibitory connections are both expected in the kind of pattern used, and that the width and height of the time delay functions should, if possible, be related to statistical models of the distortion (e.g., time warp) functions.

EXAMPLE

Figure 8:
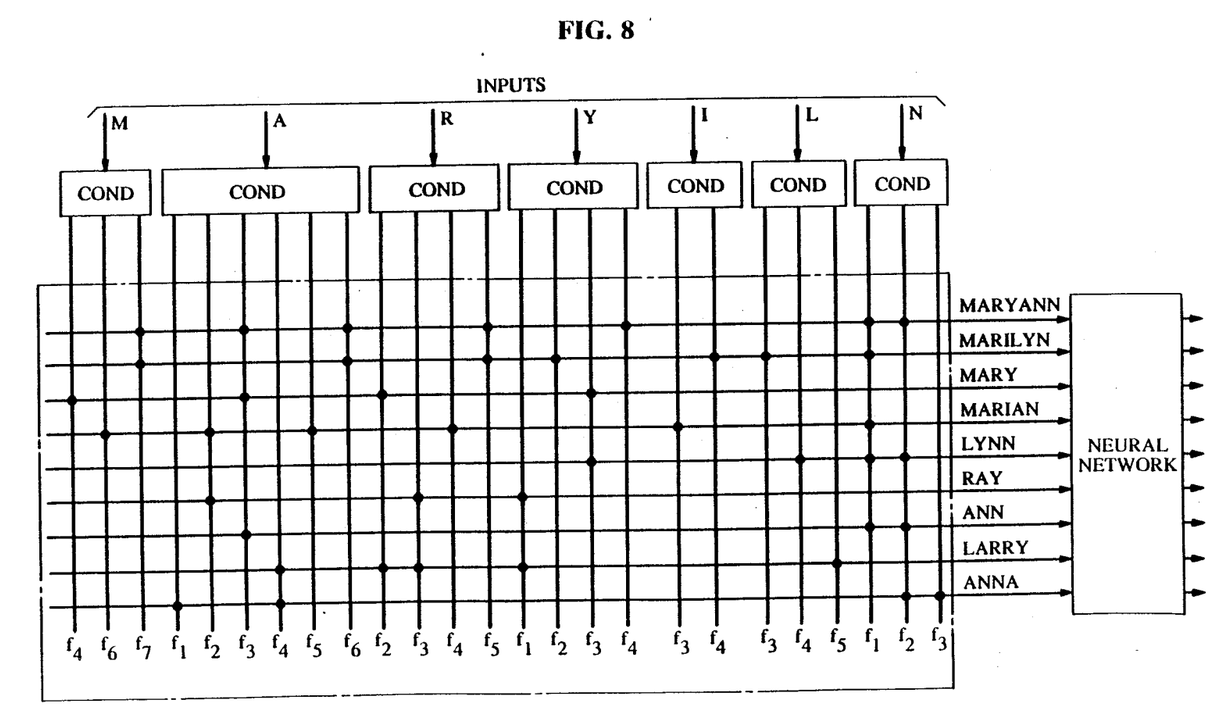
FIG. 8 gives an example showing the specific connections within the interconnection network for detecting nine different name sequences in an applied input signal.

To illustrate the operation of our invention, the following presents a generic sequence recognition problem, where the aim is to detect the sequences of letters in the following names:
MARYANN
MARILYN
MARY
MARIAN
LYNN
RAY
ANN
LARRY and
ANNA and assign neurons 1-9 in the embodiment depicted in FIG. 8 as the word recognizer neurons to be activated when the respective names are detected in an applied input signal ("grandmother" cell arrangement). The information can be focused at a time near the conclusion of the presented series, by following the prescription of Equation (2). Proceeding, since "M" is the first entry in the sequence "MARYANN" (which contains 7 characters), $T_{1M;7}=1$. This provides a delayed input to neuron 1 that is centered 7 time units away via $f_7(\tau)$. Since "A" is in position 2 (and in position 5), $T_{1A;6}=1$ (as is $T_{1A;3}$), and that provides a delayed input to neuron 1 that is centered 6 time units away via $f_6(\tau)$ (and a delayed input to neuron 1 that is centered 3 time units away via $f_3(\tau)$). Extending further, $T_{1R;5}=T_{1Y;4}=T_{1N;2}=T_{1N;1}=1$, yielding the situation where neuron 1 is responsive to the sequence MARYANN in the input stream. In accordance with this simple procedure, the remaining synaptic connections for input interconnection network 60 may be established as shown in FIG. 8, to provide for detection of the remaining names.

Figure 9:
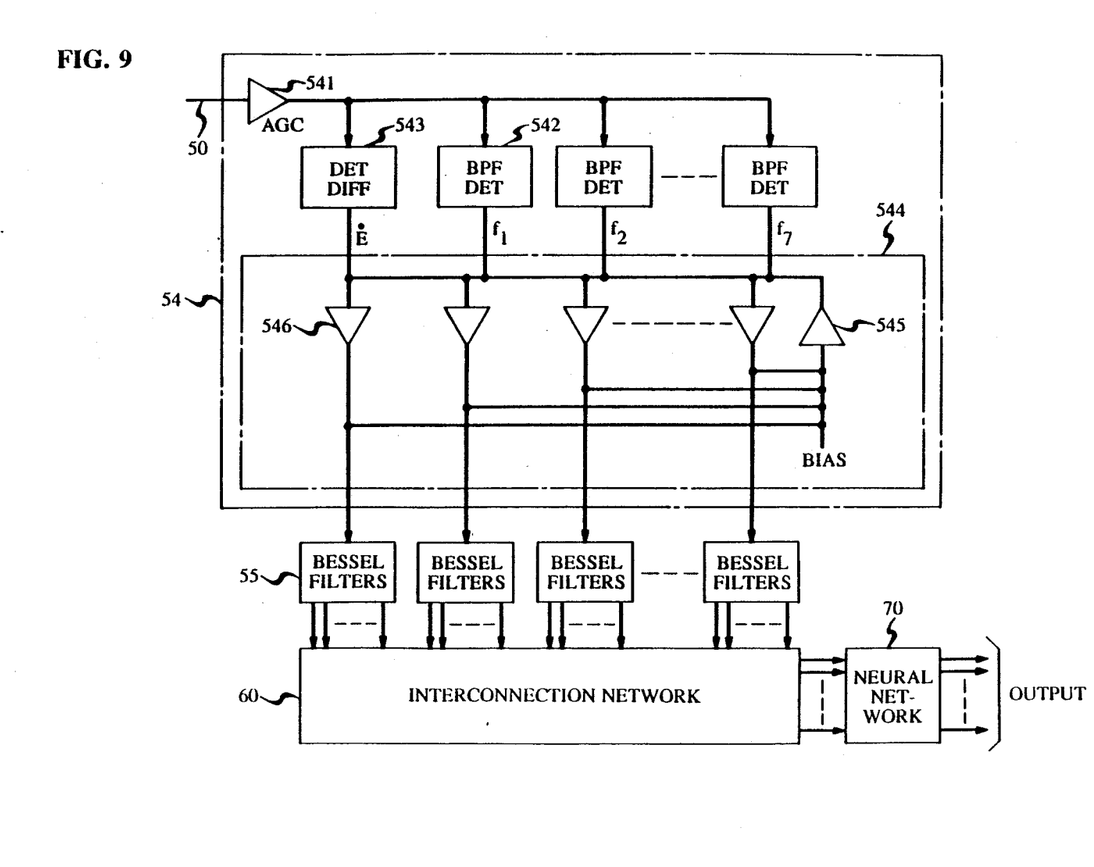
FIG. 9 presents another structural embodiment incorporating the principles of our invention.

FIG. 9 depicts a simple speech detection circuit in conformance with the principles of our invention. Because of its simplified nature the FIG. 9 circuit is speaker-dependent. For some commercial applications speaker dependence is an asset (e.g., voice actuated access to one's home). In FIG. 9, the feature detector output signals are obtained from a single feature detector 54 (as compared to the plurality of elements in FIG. 2), and that feature detector comprises an AGC circuit 541 responsive to input signals of line 50, bandpass filter/detector elements 542 responsive to AGC 541, a detector/differentiator 543 responsive to AGC 541, and a linear programming circuit 544. Bandpass filters 542 are arranged in FIG. 9 to detect the presence of energy in selected narrow bands between 200 Hz to 3.5 kHz. Hence, each of the filters is a narrow band filter (with a Q value of approximately 5), with the center frequencies of the bandpass filters distributed linearly on a logarithmic frequency scale. The outputs of the bandpass filters are rectified and integrated to provide an output for each element 542 that is a measure of the power within the detected band that is present in the input signal. In addition to the narrow band energies, broadband energy is detected in element 543 and differentiated to provide a measure of dE/dt in the input signal.

Linear programming circuit 544 comprises linear amplifiers 546 interposed between each input and output of circuit 544 and, in addition, the output signals of amplifiers 546 are combined with a bias signal and applied to a constraint neuron (amplifier 545). Amplifer 545 creates an inhibiting signal that is applied to the input of all amplifiers 546 whenever the sum of the output signals of amplifiers 546 exceeds the bias signal. If the outputs of the 542, 543 detectors are described by signals $Y_0, Y_1, \ldots, Y_7$ and the outputs of amplifiers 546 are described by signals $W_0, W_1, \ldots, W_7$ then the linear programming circuit provides a set of $W_i$ which maximize the sum $$Y_0W_0 + W_1Y_1 + \ldots + Y_7W_7$$

subject to the constraint $$W_0 + W_1 + \ldots + W_7 \leq \text{bias signal.}$$

When the signals are strong, this maximization selects the largest channel, inhibiting the others. The outputs of elements 544 comprise the outputs of feature detector 54, and those outputs are fed to signal conditioner units (stretchable delay means) 55. Units 55 of FIG. 9 comprise ten four-pole bassel filters, each with a different $\tau$. As in FIG. 2, the outputs of units 55 are fed to interconnection network 60, and interconnection network 60 applies its output signals to neural network 70.

What is claimed is:

1. A system for recognizing at least one pattern comprising:
   a plurality of stretchable delay means, each responsive to an applied input signal and each developing a set of different delayed signals, with said different delayed signals in each set differing from each other in delay and duration;
   an interconnection network for selectively connecting said delayed signals to a plurality of outputs; and
   a network responsive to said plurality of outputs for developing a preselected output signal indicative of recognition of said pattern.

2. The system of claim 1 wherein each of said different delayed signals in said set are developed by transforming said applied input signal with a preselected function having a parameter other than one related to delay that is set to a different value for each of said different delayed signals.

3. The system of claim 1 wherein said input signal applied to each of said stretchable delay means corresponds to a component of said pattern.

4. The system of claim 1 wherein said selectively connecting in said interconnection network is achieved via conductances of a prechosen value that are connected between inputs of said interconnection network and outputs of said interconnection network.

5. The system of claim 1 further including pattern component detection means responsive to an input signal of the system for developing said input signal applied to each of said stretchable delay means corresponding to the detection of said pattern in said input signal of the system.

6. The system of claim 1 wherein said input signal applied to each of said stretchable delay means corresponds to different components of said pattern.

7. A pattern recognition system responsive to a input signal composed of concatenated pattern components, $X_m$, and developing a plurality of output signals, $V_i$, comprising:
   a feature detector responsive to said input signal for developing output signals $D_{X_m}(t-\tau)$, where m is a selected integer in the range 1 to M, M being an integer, developing and output signal that is 1 when pattern component $X_m$ is present within said input signal at time $t=\tau$ and 0 otherwise, $\tau$ being a selected constant,
   an M plurality of conditioners, each responsive to one of said $D_{X_m}(t-\tau)$ signals and developing K conditioner output signals, with each of said conditioner output signals being responsive to said $D_{X_m}(t=\tau)$ signal and to $f_k(\tau)$, where k is an integer in the range 1 to K, K being another integer, and $f_k(\tau)$ is a selected stretchable delay function that relates the $k^{th}$ output signal of a conditioner to the conditioner's input signal each of said $f_k(\tau)$ functions being different from each other; and
   a decision circuit responsive to output signals of said conditioners that develops an output signal in accordance with an energy function describing the behavior of the circuit that decreases with time during operation of said decision circuit and includes the component $$E = \sum_i \sum_{X_m} \sum_k V_i \int_0^\infty T_i X_m; k f_k(\tau) D X_m(t-\tau) d\tau$$

where $T_iX_m;k$ is a constant having a contributing value when $X_m$ with delay provided by $f_k(\tau)$ contributes to the activation of said signal $V_i$ as part of said pattern recognition, and having a noncontributing value otherwise.

8. The system of claim 7 wherein said contributing value is a 1 and said noncontributing value is 0.

* * * * *